Oct. 19, 1926.

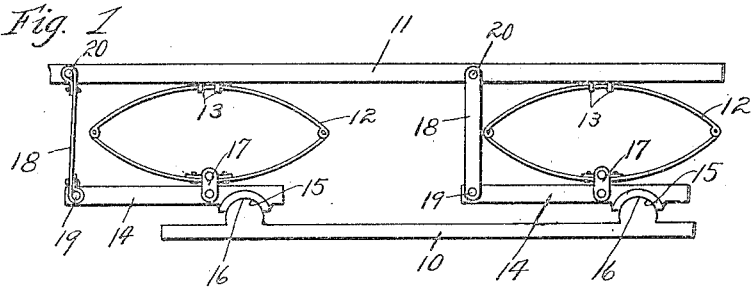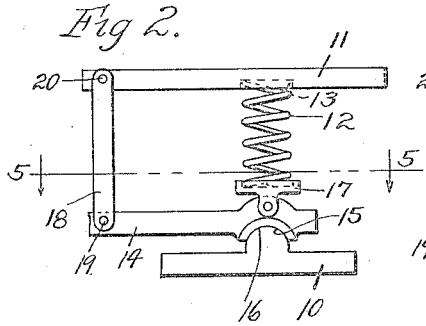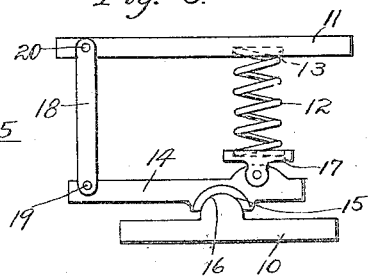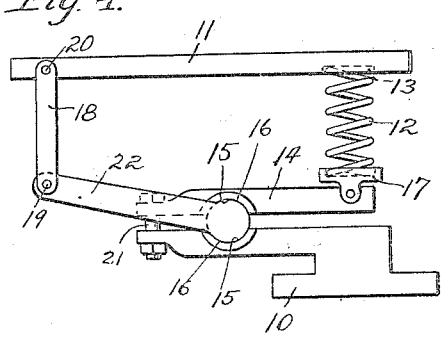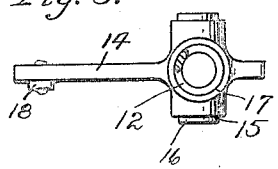

H. HELMHOLTZ ET AL 1,603,602

SHOCK ABSORBER

Filed June 28, 1920     2 Sheets-Sheet 2

Inventors:
Henry Helmholtz
John G. Fox
By Charles M. Nissen
Atty.

Patented Oct. 19, 1926.

1,603,602

UNITED STATES PATENT OFFICE.

HENRY HELMHOLTZ AND JOHN G. FOX, OF CHICAGO, ILLINOIS.

SHOCK ABSORBER.

Application filed June 28, 1920. Serial No. 392,320.

Our invention relates to shock absorbers and has for one of its objects the provision of simple and efficient means for utilizing friction between friction surfaces in conjunction with cushioning springs to facilitate the operation of said springs.

Another object is the provision of simple and efficient means for utilizing friction in conjunction with cushioning springs for retarding and controlling the recoil of said springs.

A further object is the provision of simple and efficient means for utilizing friction in conjunction with cushioning springs so that variation of force used on said springs varies the amount of friction produced.

A still further object is the provision of simple and efficient means including friction surfaces and levers in conjunction with cushioning springs for controlling the recoils of said springs and also facilitating the operations of said springs.

Other objects will appear hereinafter.

Embodiments of our invention are suggested in the accompanying drawings, forming a part of this specification, and in which—

Fig. 1 is a side elevation, more or less diagrammatical, showing two spring cushion elements equipped with our invention;

Figs. 2, 3, and 4 are views similar to Fig. 1, except showing single elements and showing various arrangements of the parts thereof;

Fig. 5 is a section taken on line 5—5 of Fig. 2;

Figure 6:
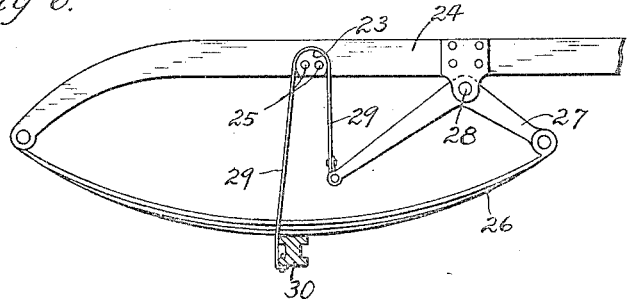
Fig. 6 is a side view of a semi-elliptic front spring vehicle construction equipped with our invention.

In Fig. 1 we have indicated a supporting member 10 and a supported member 11 spaced above the member 10 with cushioning springs 12 between said members. The springs 12 are indicated as being attached to the member 11, as at 13, and connected with member 10 through levers 14 and friction surfaces 15 and 16, together with links 17. At the left-hand side of Fig. 1 we have indicated a flexible link 18 connected as at 19 to lever 14, and as at 20 to member 11. At the right-hand side of this figure we have indicated the link 18 as being rigid and connected as at 19 and 20 to lever 14 and member 11. It will be understood that members 10 and 11 are always to be arranged so that they are held against relatively longitudinal and lateral horizontal movements and free to move toward and away from each other as controlled by cushion springs 12 and the parts of our improved shock absorber.

With a device equipped as indicated in Fig. 1 should a load be suddenly placed on member 11, springs 12 would be compressed, thereby permitting member 11 to move down toward member 10, and this downward movement of member 11 acting through the pressures from springs 12 through members 17 to levers 14 would swing the latter about the friction surfaces 15 and 16. As soon as the load is removed, the compression of springs 12 would throw member 11 back up to its position indicated, thereby moving levers 14 back to their positions indicated and utilizing the friction between surfaces 15 and 16 to retard the recoil of said springs, thereby permitting the springs to come back to their positions shown without sudden movement or jerking of member 11.

In Fig. 2 spring 12 is indicated as a coil spring and positioned directly over friction surfaces 15 and 16 so that the weight of a load on member 11 would not tend to move lever 14, except through link 18. In this construction the friction exerted when a load is applied to member 11 acts substantially the same as when said load is removed.

In Fig. 3 spring 12 is also indicated as a coil spring, and from this it will be clear that any form of spring may be used, as desired. In this figure the force exerted by spring 12 on lever 14 is at the opposite side of friction surfaces 15 and 16 to that in Fig. 1. In this construction the downward movement of a load on member 11 is taken on both ends of lever 14, and the downward movement of lever 14 under the influence of a load when compressing spring 12 moves an end of said lever up against spring 12, thereby tending to compress said spring from both ends. In each of these cases the load in exerting a force downward on member 11 causes friction between the friction surfaces 15 and 16 upon movement of lever 14 both downwardly and upwardly, thereby facilitating the operation of spring 12 and also retarding the recoil of said spring after the load is removed, thereby helping to absorb both the shock tending to compress said spring, and the shock when the influence of the load is removed from said spring.

In Fig. 4 lever 14 is connected to supporting member 10 by means of a bolt 21, and the friction surfaces 16 are formed both in lever 14 and base 10, while the friction 15 is provided on a member carrying a lever 22. The spring 12 is arranged to exert its force on the end of lever 14 so as to tightly grip the friction surfaces 15 between the friction surfaces 16. This causes much more friction due to the leverage action than in Figs. 1 to 3, inclusive, but the friction produced operates in substantially the same manner as that already described. Where heavy loads are to be handled or where the shocks are very severe this form of construction is desirable. It is also advantageous where only a portion of the tension of spring 12 is available.

By varying the distances between the friction surfaces 15 and 16 and points 21, 19 and 17, respectively, it will be apparent that different amounts of friction will be produced by a given load and that this may be varied to suit different requirements. Varying one or more of these distances controls the effectiveness of the friction in retarding the relative movements of members 10 and 11.

In Fig. 6 we have indicated our invention as applied to a semi-elliptic front vehicle spring, being applied to the rear of said spring. When applied to such a construction we preferably provide a friction block 23 on the vehicle frame 24 held against rotary movement, such as by bolts or rivets 25. The rear end of the semi-elliptic spring 26 is pivoted to an angular lever 27 which is pivoted as at 28 to the frame 24. A flexible member 29 connects an end of lever 27 with the vehicle axle 30 and passes over friction block 23. With this construction it will be apparent that should the vehicle hit an obstruction in the road and the axle 30 be quickly forced up toward frame 24 that the spring 26 would yield, thereby pulling downwardly on the end of member 29 attached to the lever 27. Whereby the strap 29 is pulled over block 23, but since the axle 30 would be moving up also there would be very little friction between straps 29 and block 23 due to the slack given strap 29. Upon the vehicle passing over such obstruction spring 26 would separate the axle and frame 24 again, and this movement of axle relatively away from frame 24 would pull down on strap 29 over block 23 with considerable friction, thereby absorbing the recoil shock of said spring.

Figure 7:
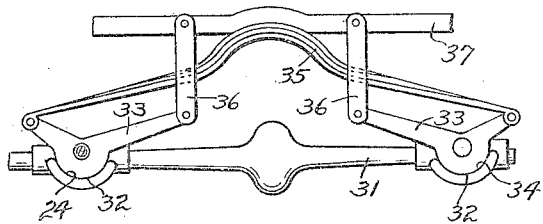
Fig. 7 is a view similar to Fig. 6, but showing a rear spring vehicle construction.

In Fig. 7 our invention is indicated as being applied to the rear spring of a conventional "Ford" car. In this construction the rear axle 31 is provided with friction members 32, and levers 33 have friction members 34 engaging the members 32. The ends of the spring 35 are connected with the short ends of levers 33, and the long ends of levers 33 are connected by means of links 36 to the frame 37 of the vehicle. In such a construction when the axle is quickly thrust up by passing over an obstruction the yielding of spring 35 causes links 36 to rock the levers 33 so as to produce friction between the surfaces 32 and 34. This friction between surfaces 32 and 34 greatly assists the spring to support its load, and this construction is particularly adapted to vehicles, and the like, which have their springs 35 overloaded, such as where the "Ford" pleasure automobile is converted into a truck.

Figure 8:
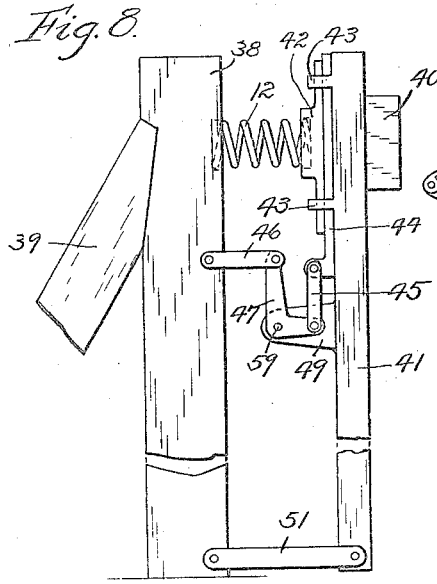
Fig. 8 is a side elevation of a bumping post construction such as used on railways.

In Fig. 8 we have indicated a bumping post such as is used at the ends of railway tracks. In such constructions there is usually a post 38 having a brace 39 and a bumper block 40. In our improved construction we provide a rigid member 41, which corresponds to member 11 in Figs. 1, 2, 3 and 4, while the post 38 corresponds to member 10 in these figures. A cushion spring 12 is provided and this spring presses against a member 42 mounted in guides 43 on member 41. Between the members 42 and 41 is a sliding member 44 which is connected through links 45 and 46 and an angular lever 47 with posts 38. The lever 47 may be pivoted to an ear 49, as at 59, on member 41 so that relative movements toward each other of members 38 and 41 moves member 44 between members 41 and 42. Member 41 is held in substantially fixed relation normally with post 38 in any desirable manner, such as by links 51, one of which is shown. When a train or other object engages bumper block 40 the force exerted thereby moves member 41 and compresses spring 12. This movement of member 41 toward post 38 moves member 44 between members 41 and 42 through the lever and link connection 45, 46 and 47 so that the friction between members 41, 42 and 44 facilitates the operation of the spring 12 in arresting the shock caused by the train, or the like, engaging bumper block 40. When the train disengages block 40 again the parts are restored to their positions indicated in Fig. 8 by the force stored up in spring 12.

Figure 9:
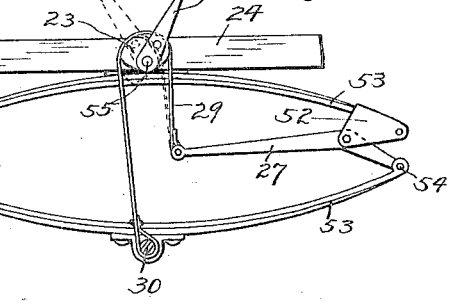
Fig. 9 is a view similar to Fig. 6, but showing our invention applied to a full elliptic vehicle spring construction.

In Fig. 9 we have indicated our invention as being applied to a full elliptic vehicle spring. This construction is similar to that indicated in Fig. 6, except that lever 27 is connected to a member 52 and the latter attached to one end of one of the halves of elliptic spring 53, the other half of said elliptic spring being pivoted to lever 27, as at 54. In this construction, as in Fig. 6, the flexible member 29 engages a friction block 23 on the frame 24. The flexible member 29 is attached to the axle 30 in any desirable manner. The operation of the device in this construction is quite similar to that already described with relation to Fig. 6, except that the flexing of both halves of spring 53 influences the operation of the shock-absorbing device.

In many instances it will be desirable to vary the amount of friction produced between the friction surfaces, such as when a vehicle or other device is arranged to carry a certain load and then the load is varied. We provide a simple and efficient means for varying the amount of friction surfaces in Fig. 9. In this form of construction the block 23 is pivoted, as at 55, to frame 24 and has a lever 56 rigidly attached thereto. The lever 56 is operated through a rod 57 and the latter operated in any desirable manner. When the block 23 is set, as indicated by full lines in Fig. 9, it will be apparent that there is considerable more friction surface between strap 29 and block 23 than when the block is moved to its dotted line position in this figure. This varying the amount of friction enables the device to be adjusted quickly for varying loads and so that the shock-absorbing feature may be tensioned to produce easy riding and a maximum amount of shock-absorbing features under all conditions.

It will be apparent that in the applications of our invention indicated in the drawings that the cushioning spring itself controls the amount of friction produced between the friction surfaces, and that this cushioning spring itself controls the shock-absorbing features of our invention.

We claim:—

1. A shock absorber comprising spaced members; a cushion spring between said members; a friction block attached to one of said members; a lever associated with the spring; and a flexible member secured at one end to the lever and to one of said members at the other end and passing around said friction block.

2. A shock absorber comprising spaced members; a cushion spring between said members; a friction block attached to one of said members; a lever associated with the spring; a flexible member connected with the lever and one of said members and passing around said friction block; and means for shifting the friction block to vary the amount of friction surface presented to the flexible member.

3. A shock absorber comprising spaced members; a leaf spring connected with one of said members; a lever pivoted to said spring and the other member; a friction block attached to one of the members; and a friction strap engaging the friction block and connected with said lever.

4. A shock absorber comprising spaced members; a leaf spring connected intermediate its ends to one of said members and at one end to the other member; a lever pivoted to an end of the spring and the last-mentioned member; a friction block connected with one of the members; and a strap connected with said lever and one of said members with an intermediate part engaging the friction block.

5. A shock absorber comprising a member to be supported; a leaf spring pivoted at one end to said member; a lever pivoted at the other end of said spring and at an intermediate part of said member; a friction block attached to said member; and a friction band connected to one end of the lever and an intermediate part of the spring and engaging said friction block.

6. A shock absorber comprising a leaf spring; an elongated member above the spring and pivoted to one end of the latter; a lever pivotally connected to the spring and elongated member; a friction block connected with the elongated member; and a strap connected with the spring and lever and passing over the friction block.

7. A shock absorber comprising a leaf spring; an elongated member above the spring and pivoted to one end of the latter; a lever pivotally connected to the spring and elongated member; a friction block connected with the elongated member; a strap connected with the spring and lever and passing over the friction block; and means for varying the amount of effective friction surfaces between the friction block and strap.

8. A shock absorber comprising a leaf spring; an elongated member above the spring pivoted to one end of the latter; a lever pivotally connected to the spring and elongated member; a friction block pivotally connected with the elongated member; a strap connected with said lever and said spring and passing over the friction block; and manually operable means connected with the friction block for moving the latter on its pivot to vary the effective friction surfaces between said block and strap.

9. A shock absorber comprising two spaced members; a leaf spring connected with one of the members; a lever pivoted to the spring and other member; a friction block pivotally mounted on one of said members; and a strap passing over the friction block and connected with said lever.

10. The combination with a main supporting spring, of levers secured to said spring to be motivated thereby and to multiply the movement and reverse the direction of movement received therefrom, frictional recoil absorbing means associated with said spring comprising a friction drum and a strap member connected at one end to said spring and at the other to said lever.

11. The combination with a cushion spring, of a lever to be motivated by the tension in said spring, frictional means to prevent recoil of said spring comprising a friction block and a strap connected to said lever at one end and to said spring at the other.

12. The combination with a vehicle supporting spring, of an angular lever positioned above said spring, said lever having pivotal engagement with one end of said spring, frictional shock absorbing means comprising a drum and a strap, said strap being operatively secured at one end to said angular lever.

In testimony whereof we have signed our names to this specification on this 22nd day of June, A. D. 1920.

HENRY HELMHOLTZ.
JOHN G. FOX.